(12) United States Patent
deVos et al.

(10) Patent No.: US 7,014,112 B2
(45) Date of Patent: Mar. 21, 2006

(54) ELECTRONIC IDENTIFICATION LABEL AND INTERROGATOR FOR USE THEREWITH

(75) Inventors: John A deVos, Corvallis, OR (US); Chinmay Betrabet, Corvallis, OR (US); Jian-gang Weng, Corvallis, OR (US); Daniel Robert Blakley, Philomath, OR (US); Olan Way, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 10/425,789

(22) Filed: Apr. 29, 2003

(65) Prior Publication Data

US 2004/0217171 A1    Nov. 4, 2004

(51) Int. Cl.
G06K 7/08    (2006.01)

(52) U.S. Cl. .................. 235/451; 235/375; 235/492

(58) Field of Classification Search ............... 235/375, 235/383, 380, 492, 451; 340/854.6, 5.6, 340/5.61, 5.64, 10.1
See application file for complete search history.

(56) References Cited

U.S. PATENT DOCUMENTS

| | | | |
|---|---|---|---|
| 3,689,885 A | 9/1972 | Kaplan et al. | |
| 3,752,960 A | 8/1973 | Walton | |
| 3,816,708 A | 6/1974 | Walton | |
| 4,045,778 A * | 8/1977 | Atkins et al. | 235/435 |
| 4,459,474 A * | 7/1984 | Walton | 235/380 |
| 4,862,160 A | 8/1989 | Ekchian et al. | |
| 4,962,369 A * | 10/1990 | Close | 340/568.1 |
| 5,287,113 A | 2/1994 | Meier | |
| 5,446,447 A | 8/1995 | Carney et al. | |
| 5,491,468 A | 2/1996 | Everett et al. | |
| 5,499,017 A | 3/1996 | Beigel | |
| 5,812,065 A * | 9/1998 | Schrott et al. | 340/10.34 |
| 5,862,174 A * | 1/1999 | Yokota et al. | 375/219 |
| 5,883,575 A | 3/1999 | Ruby et al. | |
| 6,072,383 A | 6/2000 | Gallagher et al. | |
| 6,104,311 A * | 8/2000 | Lastinger | 340/10.51 |
| 6,377,136 B1 | 4/2002 | Rittenhouse et al. | |
| 6,496,113 B1 | 12/2002 | Lee et al. | |
| 6,731,199 B1 * | 5/2004 | Ueda | 340/10.4 |
| 2002/0160713 A1 | 10/2002 | Flaxl | |

FOREIGN PATENT DOCUMENTS

| | | |
|---|---|---|
| EP | 0 297 688 A1 | 1/1989 |
| EP | 0 377 257 A1 | 7/1990 |
| EP | 0 398 087 A2 | 11/1990 |

OTHER PUBLICATIONS www.electronics123.com/amazon/datasheet/k9.pdf; "DIY Kit 9.Oscillator Building Blocks"; 2 pgs.; Printed From Web.

* cited by examiner

Primary Examiner—Ahshik Kim

(57) ABSTRACT

A method of conveying information from an electronic identification label to an interrogator includes coupling energy from an external field into a resonant circuit of the electronic identification label. The method also includes the electronic identification label periodically storing and discharging an amount of the coupled energy wherein the period that the electronic identification label stores and discharges the energy conveys information about the electronic identification label to the interrogator.

22 Claims, 10 Drawing Sheets

Electronic Identification Label Cell 200

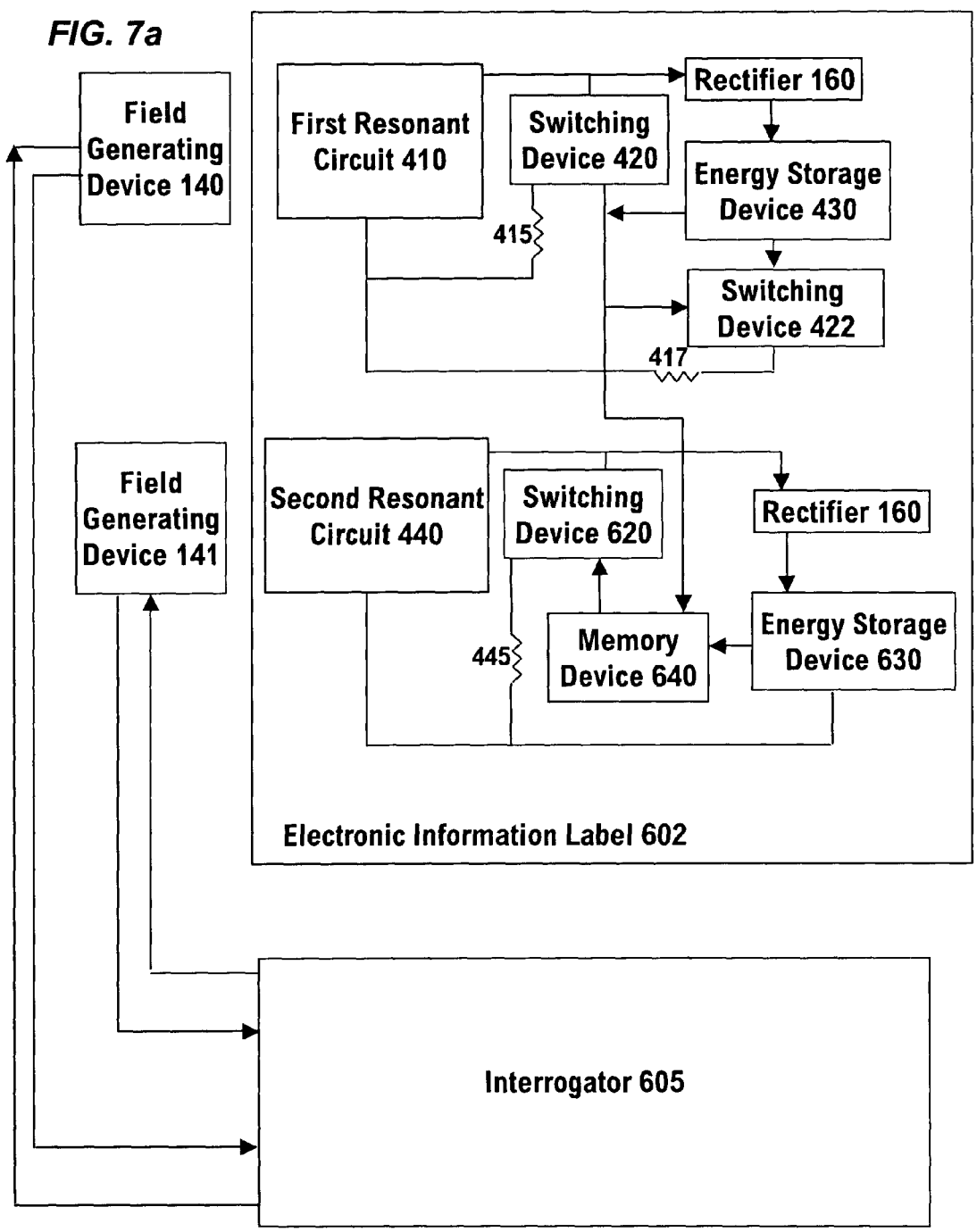

ELECTRONIC IDENTIFICATION LABEL AND INTERROGATOR FOR USE THEREWITH

BACKGROUND OF THE INVENTION

In many industrial and commercial distribution environments, there is a need to determine information about a particular item or package quickly, and with a minimum of user intervention. For example, in a manufacturing environment, parts must be tracked at all times from the assembly stage until the delivery of the particular part to the customer. The technology to perform these tracking functions has evolved from labor-intensive manual processes, to optical scanning, involving barcode readers that scan universal product code (UPC) labels, and into the radio frequency identification (RFID) domain.

In an optical scanning system, a barcode reader generates a low-power laser signal that is reflected off a paper label that includes a UPC. The reflected signal is converted to digital information that can be interpreted by a computer. However, in an optical scanning system, the optics through which the low-power laser signal and its reflection are passed can become dirty and require frequent maintenance. Further, the UPC label can only be read when the barcode is visible to the barcode reader, thus requiring the label to be affixed to an outer surface of the package. These factors increase the cost of optical barcode scanning systems, and limit their acceptance in industrial and commercial environments.

In an RFID system, a passive responder receives energy generated by an interrogator unit. The responder generates a message in response to the presence of the energy received from the interrogator unit. However, these systems can require complex circuitry to be embedded in the passive responder, thereby increasing cost and, in turn, limiting the acceptance of RFID systems.

SUMMARY OF THE INVENTION

A method of conveying information from an electronic identification label to an interrogator includes coupling energy from an external field into a resonant circuit of the electronic identification label. The method also includes the electronic identification label periodically storing and discharging an amount of the coupled energy wherein the period that the electronic identification label stores and discharges the energy conveys information about the electronic identification label to the interrogator. The method can be practiced without requiring complex circuitry to be embedded in the electronic identification label.

BRIEF DESCRIPTION OF THE DRAWINGS

FIG. 7a is a block diagram of an electronic identification label according to another embodiment of the invention.

DESCRIPTION OF THE EMBODIMENTS

Figure 1:
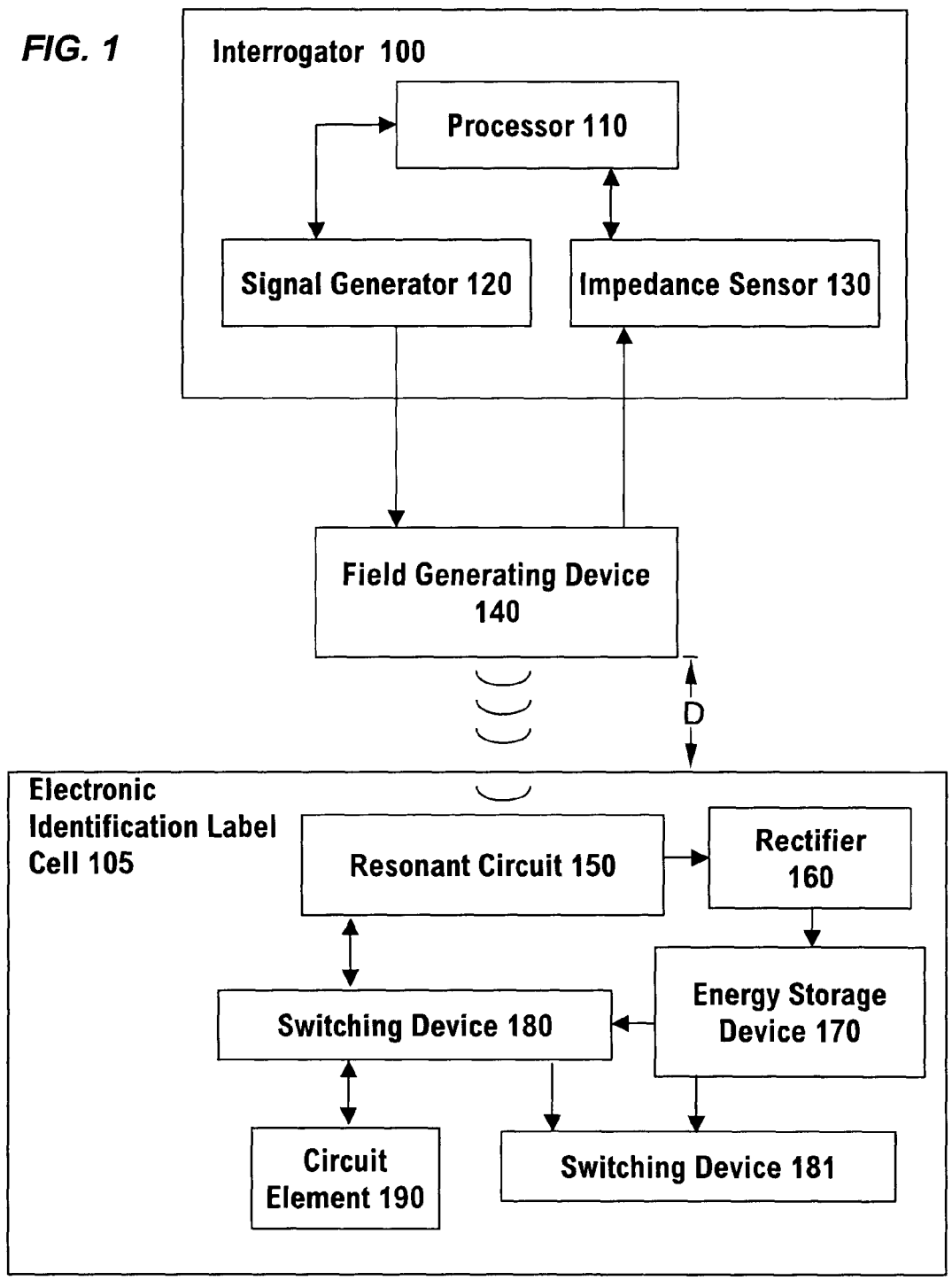
FIG. 1 is a block diagram of a basic unit, or "cell" of an electronic identification label and an interrogator that operates with the electronic identification label cell according to an embodiment of the invention.

FIG. 1 is a block diagram of a basic unit, or "cell" of an electronic identification label and an interrogator that operates with the electronic identification label cell according to an embodiment of the invention. In FIG. 1, signal generator 120 of interrogator 100 generates a signal at a first frequency that is coupled to field-generating device 140. In the embodiment of FIG. 1, signal generator 120 generates a signal in the 10–20 MHz range, although nothing prevents the use of frequencies lower than 10 MHz or higher than 20 MHz according to the particular needs of the application. In one embodiment, signal generator 120 generates a signal near 13.56 MHz in accordance with a contemporary RFID system.

In the embodiment of FIG. 1, field-generating device 140 is a magnetic field generator that includes one or more inductor or other inductive device. Field-generating device 140 can also represent any other type of field-generating device that generates a time-varying magnetic field at the frequency generated by signal generator 120. In FIG. 1, field-generating device 140 is positioned external to electronic identification label cell 105 at a coupling distance "D" from the cell. Coupling distance "D" represents between 2 and 20 centimeters, although other embodiments of the invention may make use of a coupling distances that are outside this range.

Electronic identification label cell 105 includes resonant circuit 150, rectifier 160, energy storage device 170, switching devices 180 and 181, and circuit element 190. In the embodiment of FIG. 1, when field-generating device 140 generates a signal at or substantially close to the resonant frequency of resonant circuit 150, an amount of energy is wirelessly coupled into and stored within resonant circuit 150. The amount of energy coupled to resonant circuit 150 is dependent upon the coupling distance (D), the quality factor (Q) of resonant circuit 150, and the strength of magnetic field generated by field-generating device 140.

As resonant circuit 150 resonates, energy is conveyed through rectifier 160 and into energy storage device 170. When energy storage device 170 has stored a predetermined amount of the coupled energy, switching device 180 is activated, thereby coupling circuit element 190 to resonant circuit 150. In the embodiment of FIG. 1, circuit element 190 can be a resistor that noticeably or significantly affects the quality factor (Q) of resonant circuit 150. As the quality factor of resonant circuit 150 is affected, impedance sensor 130 senses a change in the ability of resonant circuit 150 to store energy wirelessly received from field-generating device 140.

As switching device 180 switches circuit element 190 into resonant circuit 150, switching device 181 functions to substantially discharge the energy stored within energy storage device 170. When the energy stored within energy storage device 170 has been substantially discharged, switching device 180 switches back to its former state, thereby decoupling circuit element 190 from resonant circuit 150. Switching device 181 also switches back to an open state, thereby isolating energy storage device 170 from ground.

As circuit element 190 is decoupled from resonant circuit 150, the resonant circuit returns to its previous, higher quality-factor state at which the resonant circuit is capable of wirelessly receiving energy from field-generating device 140. The change in the quality factor of resonant circuit 150 is sensed by impedance sensor 130 of interrogator 100. By way of impedance sensor 130, processor 110 is able to determine the period during which circuit element 190 is coupled to and decoupled from resonant circuit 150.

Switching device 180 may make use of one or more transistors that respond to a particular voltage being present at an output of energy storage device 170. Thus, for example, in the event that energy storage device 170 is capable of developing a significant voltage after only a small amount of energy is coupled from resonant circuit 150, switching device 180 more frequently couples and decouples circuit element 190 into and out of resonant circuit 150. In the event that energy storage device 170 requires a longer period of time to develop a significant voltage, switching device 180 less frequently couples and decouples circuit element 190 into and out of resonant circuit 150.

Therefore, in the embodiment of FIG. 1, the number of changes per unit time in the quality factor of resonant circuit 150 is influenced by the capacity of energy storage device 170. In this embodiment, these changes per unit time in the quality factor of resonant circuit 150, as these changes are sensed by impedance sensor 130 and processed by processor 110, convey information about the electronic identification label cell 105 to interrogator 100.

Figure 4A:
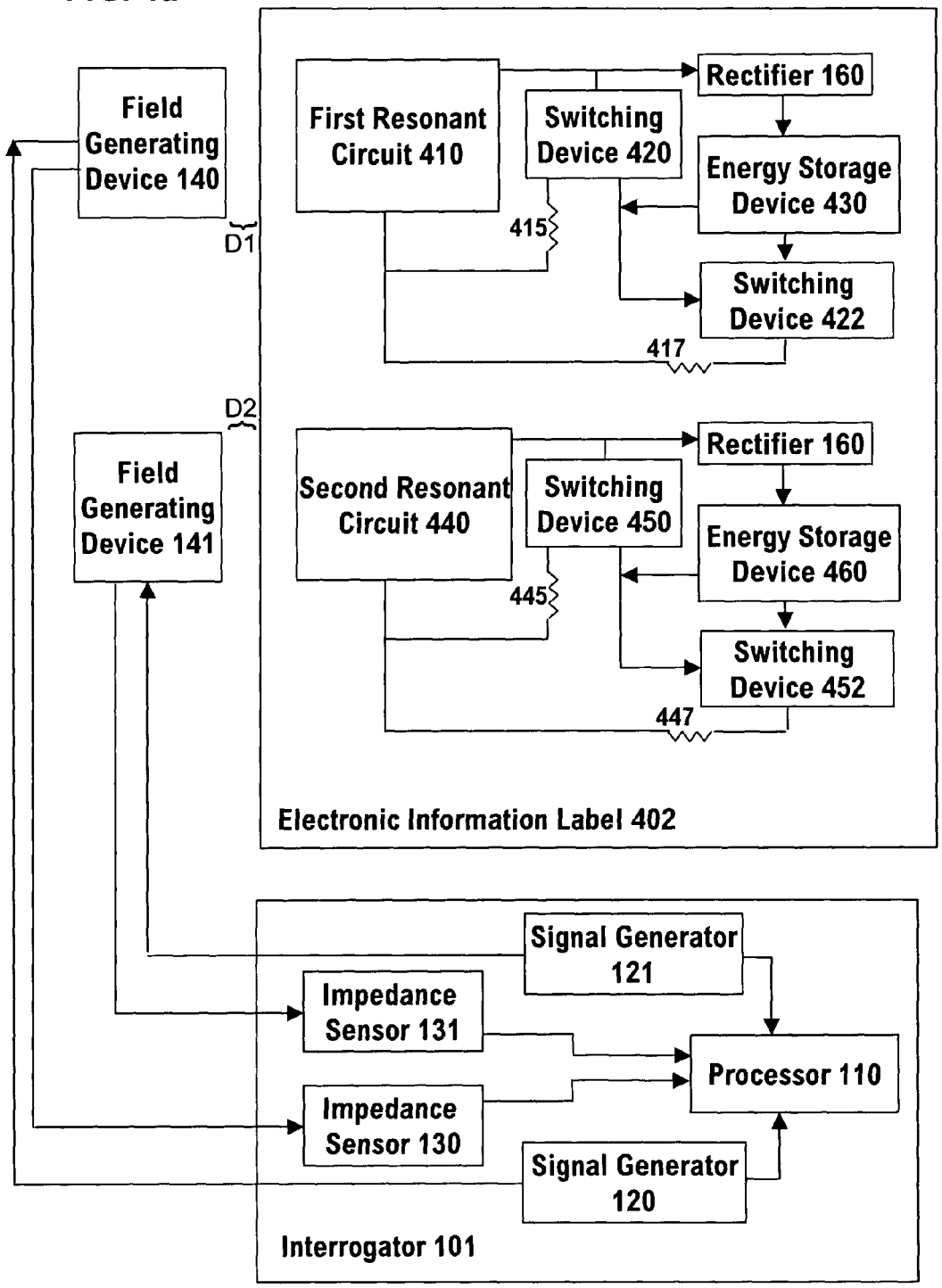
FIG. 4a is a block diagram of an electronic identification label that includes two electronic identification label cells according to an embodiment of the invention.

In the embodiment of FIG. 1, processor 110 need only possess the capability to count changes in the input impedance of field-generating device 140 as a function of time. In other embodiments of the invention (such as that of FIG. 4*a*), processor 110 may be required to perform comparisons in the number of changes per unit time received from a first impedance sensor with those received from a second impedance sensor. In the embodiment of FIG. 4*a*, the changes per unit time received from a first impedance sensor provide a data frame within which the changes per unit time of a second impedance sensor can be measured. In still other embodiments of the invention (such as that of FIG. 7*a*) processor 110 may be required to decode a series of binary digits conveyed by way of changes in the input impedance received from a second electronic identification label cell using timing or clock information received from a first electronic identification label cell.

Resonant circuit 150 of FIG. 1 can be any parallel or series resonant circuit in which a large current and/or voltage amplitude is achieved within the circuit using a relatively small periodic stimulus from a wirelessly coupled device such as field-generating device 140. The stimulus can be of the same or nearly the same period as the natural frequency of the circuit. Thus, resonant circuit 150 can be embodied using either series or parallel resonance that includes at least one lumped element capacitor and at least one inductor suitably coupled to produce a large current and/or voltage amplitude. In other embodiments, resonant circuit 150 may include but a single inductor that includes a parasitic capacitance sufficient to produce resonance at a desired frequency. Still other embodiments of the invention may include resonant structures such as microwave and millimeter wave microstrip and stripline circuits in which open and shorted sections of transmission line function as resonant circuits.

Figure 2:
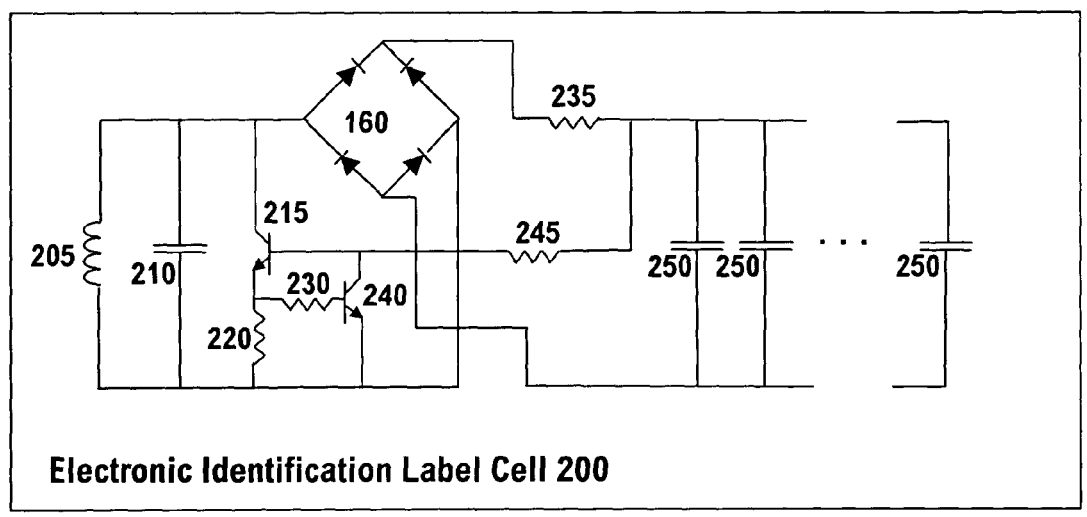
FIG. 2 is a circuit diagram of an electronic identification label cell according to an embodiment of the invention.

FIG. 2 is a circuit diagram of a cell of an electronic identification label according to an embodiment of the invention. In FIG. 2, inductor 205 and capacitor 210 form a parallel resonant circuit that wirelessly receives energy at a predetermined frequency from an external source, such as field-generating device 140 of FIG. 1. As the resonant circuit absorbs energy, an amount of the energy is coupled through rectifier 160, through resistor 235, and onto one or more of capacitors 250. As energy is stored on capacitors 250, the voltage across the parallel plates of the capacitors increases. As the voltage increases beyond a predetermined level, transistor 215 transitions to an active ("on") state, thus coupling resistor 220 into the resonant circuit formed by inductor 205 and capacitor 210. When transistor 215 is active, current conveyed through resistor 230 to transistor 240 enables transistor 240 to transition to an active state, thereby providing a conductive path to substantially or at least partially dissipate the energy stored on capacitors 250. Resistor 245 limits the rate of discharge of capacitors 250. When capacitors 250 have been sufficiently discharged, transistor 215 returns to an inactive ("off") state, thereby decoupling resistor 220 from the resonant circuit formed by inductor 205 and capacitor 210. The resonant circuit then begins to receive and store energy commensurate with the higher quality-factor state of the resonant circuit.

FIG. 2 shows multiple capacitors 250 as storing energy from the resonant circuit formed by inductor 205 and capacitor 210. In the event that individual values of capacitors 250 are small, or in the event that very few of capacitors 250 are present, only a small amount of energy need be present for capacitors 250 to attain a voltage sufficient to activate transistor 215 and, in turn, couple resistor 220 into the resonant circuit. Conversely, in the event that individual values of capacitor 250 are larger, or in the event that a greater number of capacitors 250 are present, a larger amount of energy is needed to attain a voltage sufficient to activate transistor 215 and, in turn, couple resistor 220 into the resonant circuit. Thus, the aggregate value of capacitors 250 can be used to control the rate per unit time that resistor 220 is coupled and decoupled into and out of the resonant circuit formed by inductor 205 and capacitor 210. It can be expected that small values of total capacitance charge and discharge quickly, while larger values charge and discharge more slowly.

FIG. 2 also shows transistors 215 and 240 as being bipolar junction transistors. However, other embodiments of the invention may employ a variety of other types of switching devices such as junction and metal-oxide-semiconductor field-effect transistors, insulated gate junction transistors, and so forth. Further, although FIG. 2 shows rectifier 160 as being a bridge rectifier, other rectifier topologies that convert an alternating current signal to a direct current signal may be used as well.

In an embodiment related to that of FIG. 2, it may be desirable for resistor 220 to offer only a small amount of resistance. In fact, alternate embodiments of the invention may accomplish this small resistance using as little as a single conductive trace to ground. This small amount of resistance can then provide the most significant change in the overall quality factor of the resonant circuit, thus enabling an interrogator, such as interrogator 100 of FIG. 1, to sense a large change in the absorption of energy of the resonant circuit. Thus, in the context of the embodiments described herein, a broad definition of the "resistor" coupled and decoupled into and out of the resonant circuits is contemplated to include conductive traces that present only minimal resistance as a function of the length and cross-sectional area of the trace.

The descriptions of FIGS. 1 and 2 have thus far not addressed the relationship that exists between the amount of energy per unit time coupled from the field-generating device (140) to the electronic identification label cell (105, 200) and the distance "D" (of FIG. 1) that separates the field-generating device from the electronic identification label cell. As explained hereinbelow, the energy received by the resonant circuit at a coupling distance "D" from the field-generating device influences the rate per unit time at which the changes in the quality factor of the resonant circuit occur.

Figure 3:
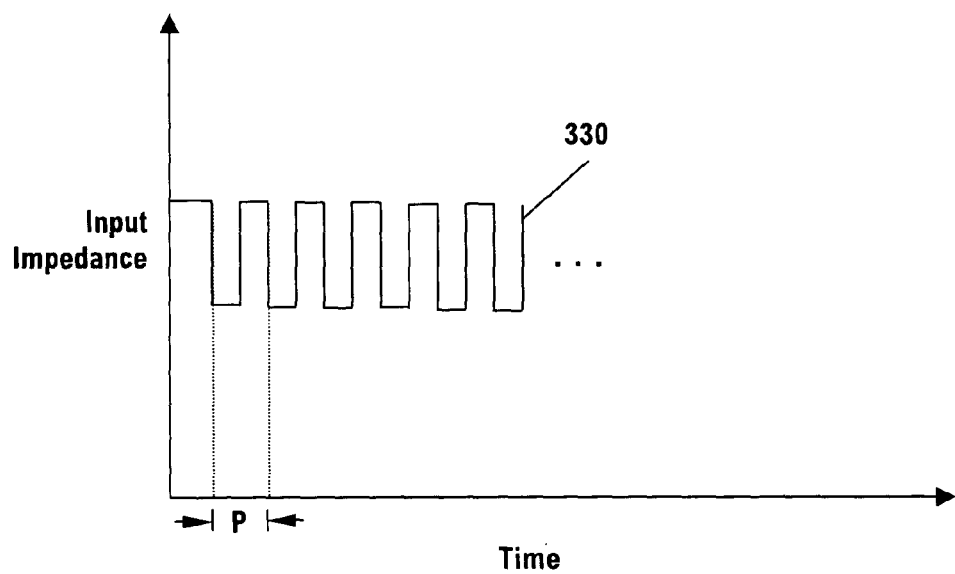
FIG. 3 is a graph of a waveform that represents the input impedance of a field-generating device coupled the interrogator of FIG. 1 according to an embodiment of the invention.

FIG. 3 is a graph of a waveform that represents the input impedance of a field-generating device (140) coupled the interrogator of FIG. 1 according to an embodiment of the invention. In FIG. 3, waveform 330 represents the changes in the input impedance of field-generating device 140. The high and low values of waveform 330 reflect the changes in the quality factor of the resonant circuit coupled to the field-generating device.

As the coupling distance "D" of FIG. 1 is increased, or if the strength of the field emanating from field-generating device 140 is decreased, the period "P" can be expected to increase as a smaller amount of energy per unit time is coupled into the resonant circuits of FIGS. 1 and 2. By coupling a smaller amount of energy into the resonant circuit, a correspondingly smaller amount of energy is coupled to the associated energy storage device. This, in turn, extends the time needed for the associated energy storage device to store sufficient energy to activate the switching device that couples the circuit element (such as resistor 220) into the resonant circuit.

In a similar manner, if the distance "D" of FIG. 1 is decreased, or if field-generating device 140 generates a stronger field, the period "P" can be expected to decrease as a larger amount of energy per unit time is coupled into the resonant circuits of FIGS. 1 and 2. By coupling a larger amount of energy into the resonant circuit, a correspondingly larger amount of energy is coupled to the associated energy storage device. This, in turn, reduces the time needed for the associated energy storage device to store sufficient energy to activate the switching device that couples the circuit element into the resonant circuit.

Although FIG. 3 shows waveforms having very regular high and low states, separated by sharp transitions between these states, it should be understood that in practice, this waveform as well as others shown and discussed herein are likely to be much less well-behaved.

FIG. 4a is a block diagram of an electronic identification label that includes two electronic identification label cells according to an embodiment of the invention. In FIG. 4a, electronic identification label 400 includes at least two of the electronic identification label cells described in FIG. 2. Field-generating devices 140 and 141 couple energy across coupling distances D1 and D2 to first resonant circuit 410 and second resonant circuit 440, respectively.

Field-generating devices 140 and 141 of interrogator 101 are coupled to signal generators 120 and 121, respectively. Frequencies generated by signal generators 120 and 121 are sufficiently separate so as to minimize the cross coupling between the field-generating devices and the adjacent resonant circuits. Impedance sensors 130 and 131 sense the input impedance of a corresponding one of field-generating devices 140 and 141 and report these impedances to processor 110.

Energy storage device 430 of electronic information label 402 stores an amount of energy coupled from first resonant circuit 410. Responsive to a predetermined amount of energy being stored within energy storage device 430, switching device 420 couples and decouples resistor 415 into and out of first resonant circuit 410. An output of energy storage device 430 is also coupled to switching device 422, which functions to at least partially discharge energy from the storage device through resistor 417. The coupling of resistor 415 into first resonant circuit 410 reduces the quality factor of the resonant circuit in a manner that can be sensed as a change in the input impedance of field-generating device 140. Impedance sensor 130 senses this change in the input impedance and conveys this information to processor 110.

In a similar manner, second resonant circuit 440 receives energy coupled from field-generating device 141. An amount of the coupled energy is stored by way of energy storage device 460. When a predetermined amount of energy has been stored in storage device 460, switching device 450 is activated to couple resistor 445 into second resonant circuit 440. While second resistor 445 is coupled to second resonant circuit 440, switching device 452 discharges energy storage device 460 through resistor 447. The coupling of resistor 445 into second resonant circuit 440 reduces the quality factor of the second resonant circuit in a manner that can be sensed as a change in the input impedance of field-generating device 141. Impedance sensor 131 senses this change in the input impedance and conveys this information to processor 110.

In the embodiment of FIG. 4a, energy storage device 430 is contemplated as having much less capacity than energy storage device 460, Further, distances D1 and D2 are contemplated as being at least approximately equal and field-generating devices 140 and 141 generate approximately equal field strengths, meaning that substantially equal energy per unit time is coupled to first and second resonant circuits. Under these circumstances, resistor 415 is coupled and decoupled into and out of first resonant circuit 410 more often than resistor 445 is coupled and decoupled into and out of second resonant circuit 440. Thus, for example, in the event that energy storage device 430 includes $\frac{1}{10}$th of the energy storage capacity of energy storage device 460 and with first and second resonant circuits 410 and 440 receiving approximately equal amounts of energy per unit time, impedance sensor 130 would measure changes in the quality factor of first resonant circuit 410 as occurring 10 times as often as impedance sensor 131 measures changes in the quality factor of second resonant circuit 440. Processor 110 then compares the changes in the input impedance of field-generating device 140 to changes in the input impedance of field-generating device 141. By way of this comparison, changes in the input impedance of field-generating device 140 are used to construct a data frame within which changes in the input impedance of field-generating device 141 can be measured.

Figure 4B:
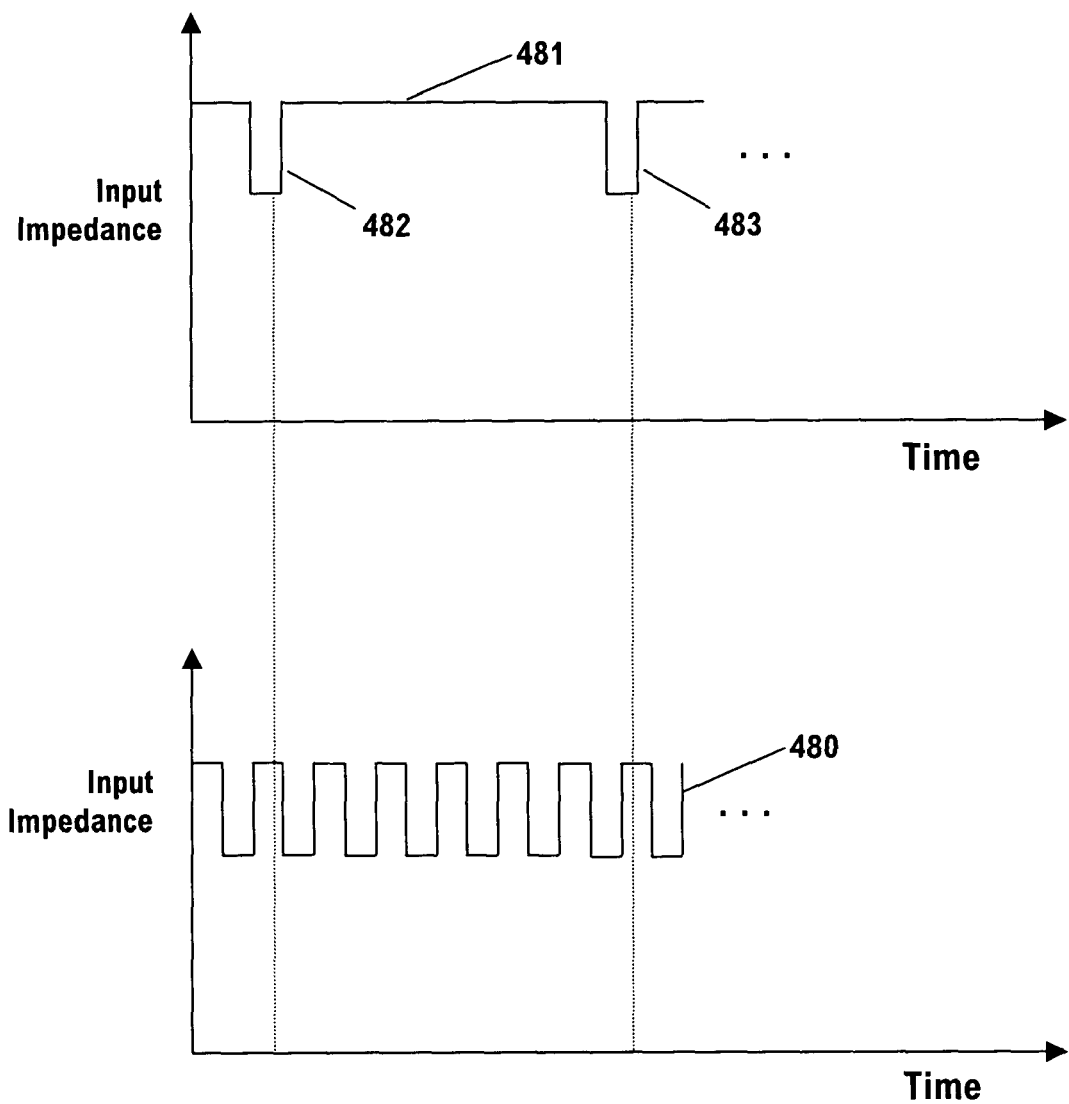
FIG. 4b is a graph of a pair of waveforms representing the input impedance as a function of time as read by an impedance sensor of the interrogator of FIG. 4a according to an embodiment of the invention.

FIG. 4*b* is a graph of a pair of waveforms representing the input impedance as a function of time as read by an impedance sensor of the interrogator of FIG. 4*a* according to an embodiment of the invention. In FIG. 4*b*, waveform 480 shows changes in the input impedance occurring rapidly as a function of time. FIG. 4*b* also includes waveform 481, which shows changes in input impedance occurring more slowly as a function of time. Thus, waveform 480 can represent changes in the input impedance of field-generating device 140 of FIG. 4*a*, while waveform 481 represents changes in the input impedance of field-generating device 141 of FIG. 4*a*. From FIG. 4*b*, it can be seen that waveform 481 includes start and end markers 482 and 483 that convey timing information that can be used as a data frame, within which the number of transitions in input impedance can be counted.

The use of two or more electronic identification label cells, such as those shown in FIG. 4*a*, allows interrogator 101 to receive information from electronic identification label 420 regardless of the distance (D1 and D2) that separates field-generating devices 140 and 141 from the label. As previously mentioned herein, as the distance between the field-generating device and the electronic identification label cell increases, the period during which the quality factor of the resonant circuit changes from "high" to "low" and back to "high" can be expected to increase as well. Thus, through the use of an electronic identification label cell that provides timing information that allows the interrogator to construct a data frame, data from a second electronic identification label cell can be measured relative to the constructed data frame.

In FIGS. 4*a* and 4*b*, only two electronic identification label cells have been shown. However a greater number of cells can be placed on electronic identification label 420 at a very low cost by way of an inkjet-printing device that prints on a paper or plastic substrate using electroactive inks. Additionally, although waveform 480 of FIG. 4*b* shows only a handful of "pulses" within the data frame of waveform 481, nothing prevents the use of an electronic identification label cell that produces dozens, hundreds, or as many as 1000 or more pulses within the data frame.

As mentioned above, an electronic identification label having multiple cells can be manufactured using inkjet-printing techniques. In manufacturing such a label, a standard number of capacitors 250 can be printed on the paper or plastic substrate. However, in this standard configuration, very few or perhaps none of capacitors 250 are initially coupled to rectifier 160. Each label can then be subsequently individually modified to couple a specific number of capacitors 250 to the rectifier, also using inkjet printing of an electroactive ink to make the appropriate connections between conductive traces. In an alternate embodiment, all of capacitors 250 are initially connected to rectifier 160 during the manufacture of the electronic identification label. The label can be subsequently individually modified to sever an appropriate number of these connections as required by a particular application.

Figure 5:
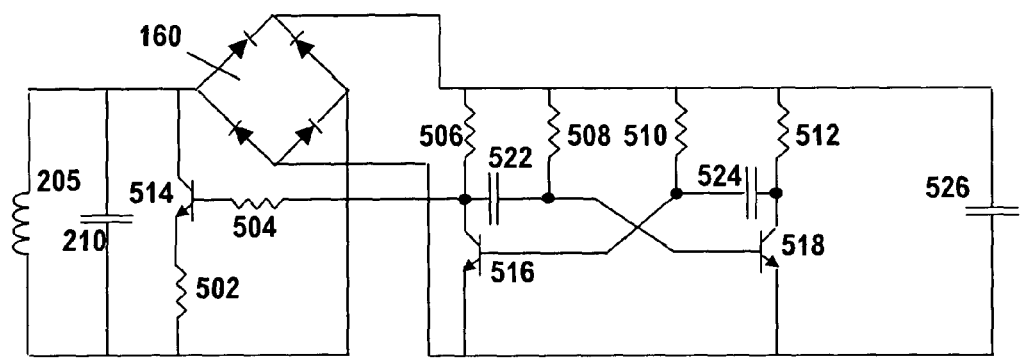
FIG. 5 is a diagram of an electronic identification label cell according to another embodiment of the invention.

FIG. 5 is a diagram of an electronic identification label cell according to another embodiment of the invention. In FIG. 5, inductor 205 and capacitor 210 form a parallel resonant circuit. Energy coupled to the resonant circuit is coupled to capacitor 526 by way of rectifier 160. When the voltage across capacitor 526 reaches an appropriate value, transistors 516 and 518 are alternately switched between active and inactive states in accordance with the operation of an astable multivibrator. In the circuit of FIG. 5, the duration of the active and inactive states associated with each transistor is influenced by the RC time constant of the resistor and capacitor associated with the opposite transistor. Thus, in this embodiment, transistor 516 is switched to an active state for a duration that is influenced by the RC time constant of resistor 510 and capacitor 524. When transistor 516 is "on", transistor 514 is also "on" (through resistor 504) and resistor 502 is coupled and decoupled into and out of the resonant circuit of inductor 205 and 210. Transistor 516 is switched "off" for a duration that is influenced by the time constant of resistor 522 and capacitor 508. Resistors 506 and 512 provide current limiting for transistors 516 and 518, respectively. Further, resistor 502 may present only a very small resistance, such as that brought about by using a single conductive trace to a ground.

Thus, in the circuit of FIG. 5, the period at which resistor 502 is coupled and decoupled into and out of the resonant circuit is controlled by the energy storage capability of capacitors 522 and 524. By controlling the value of these capacitors, which influences the rate at which energy is stored and discharged per unit time, the electronic identification label cell of FIG. 5 can convey information about the cell to interrogator 100. In some applications, this may provide a more reliable circuit than that of FIG. 2.

Figure 6:
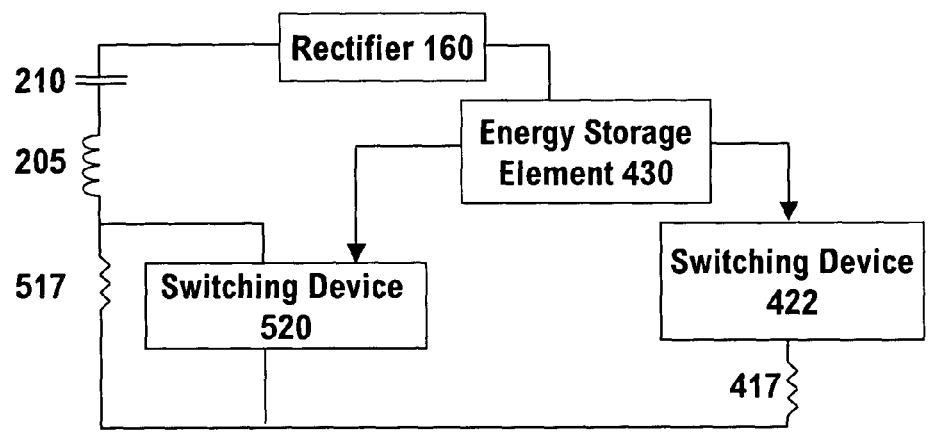
FIG. 6 is a block diagram of an electronic identification label cell according to another embodiment of the invention.

FIG. 6 is a block diagram of an electronic identification label cell according to another embodiment of the invention. In the embodiment of FIG. 6, a switching device (520), which can be a transistor such as transistor 215 of FIG. 2, couples resistor 517 into a series resonant circuit to influence the quality factor of the series resonant circuit formed by inductor 210 and capacitor 205. Energy storage element 430, switching device 422, and resistor 417 perform functions similar to those functions performed in previously discussed embodiments of the invention.

In the embodiments of the invention discussed hereinabove, a resistor or other circuit element has been coupled and decoupled into and out of a first and/or second resonant circuit to provide a current path out of the resonant circuit to a ground, thus affecting the quality factor of the resonant circuit. However, other embodiments of the invention may make use of a switching device that opens a connection between the elements of the resonant circuit, thus stopping the current flow between the reactive devices of the resonant circuit.

FIG. 7*a* is a block diagram of an electronic identification label (602) according to another embodiment of the invention. In FIG. 7*a*, field-generating devices 140 and 141 are placed within a coupling distance of first resonant circuits 410 and 440, respectively. Interrogator 605 interfaces with field-generating devices 140 and 142 and performs many functions similar to those performed by interrogator 101 of FIG. 4*a*. First resonant circuit 410, rectifier 160, energy storage device 430, switching device 420, switching device 422, and resistors 415 and 417 function in a way that is similar to their function described in reference to FIG. 4*a*.

FIG. 7*a* also includes second resonant circuit 440, an additional rectifier 160, energy storage device 630, switching device 620 and memory device 640. As energy is coupled into first resonant circuit 410, an output of energy storage device 430 is conveyed to memory device 640. As previously mentioned in the description of FIG. 4*a*, a first electronic identification label cell, such as the cell associated with first resonant circuit 410, can be used to generate timing information. In the embodiment of FIG. 7*a* however, the time varying output of energy storage device 430 is also used as a clock input to memory device 640. Thus, the period of coupling and decoupling of resistor 415 into and out of first resonant circuit 410 (resulting from the periodic charging and discharging of energy storage element 430) is also used as a clock input to control the operation of memory device 640.

Figure 7B:
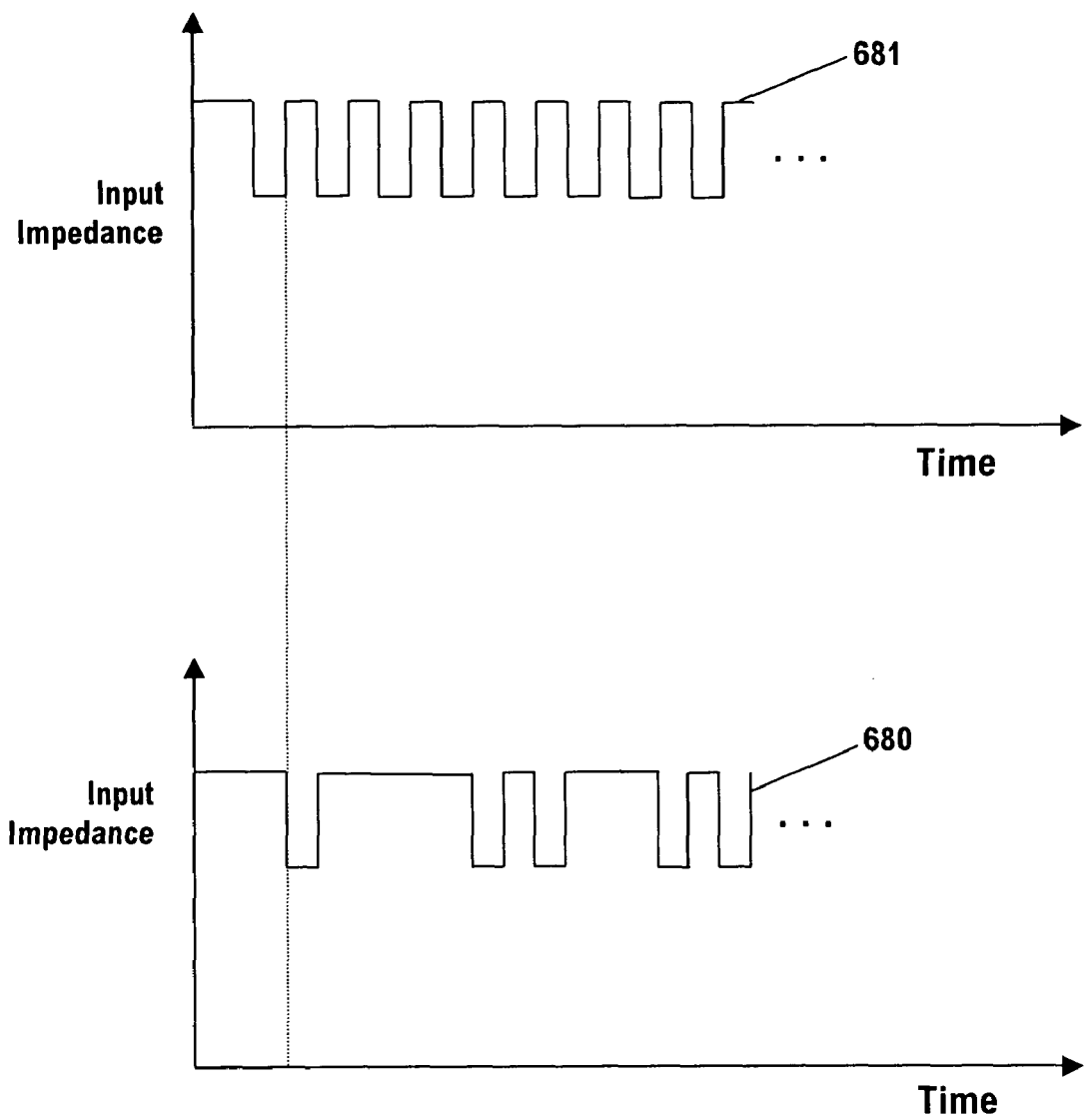
FIG. 7b is a graph of a pair of waveform's representing the input impedance as a function of time read by impedance sensors of the interrogator of FIG. 7a according to another embodiment of the invention.

In the embodiment of FIG. 7a, memory device 640 represents a serial memory device, state machine, or other logic device (or a group of devices) that output a predetermined and perhaps unique code of binary digits. The coded output is input to switching device 620, which couples and decouples resistor 445 into and out of second resonant circuit 440. Waveforms representing the clock input as well as the output of memory device 640, as sensed by the impedance sensors of interrogator 605, are shown in FIG. 7b.

In FIG. 7b, waveform 681 represents the time varying input impedance of field-generating device 140. Waveform 680 represents the time-varying input impedance of field-generating device 141 and is clocked on the rising edge of waveform 681. As can be seen from the Figure, waveform 681 functions as a reference clock that determines the period of coupling and decoupling for the digital outputs of memory device 640.

Although not shown in FIG. 7a or 7b, memory device 640 can include a divider circuit that divides the reference clock input from switching device 420 to provide a ratio in the period of waveform 680 based on the period of waveform 681. For the case of an exemplary divide-by-two circuit, waveform 681 includes two periods of coupling and decoupling for each binary digit provided by waveform 680. For the case of a divide-by-four circuit, waveform 681 includes four periods of coupling and decoupling for each binary digit provided by waveform 680.

Figure 8:
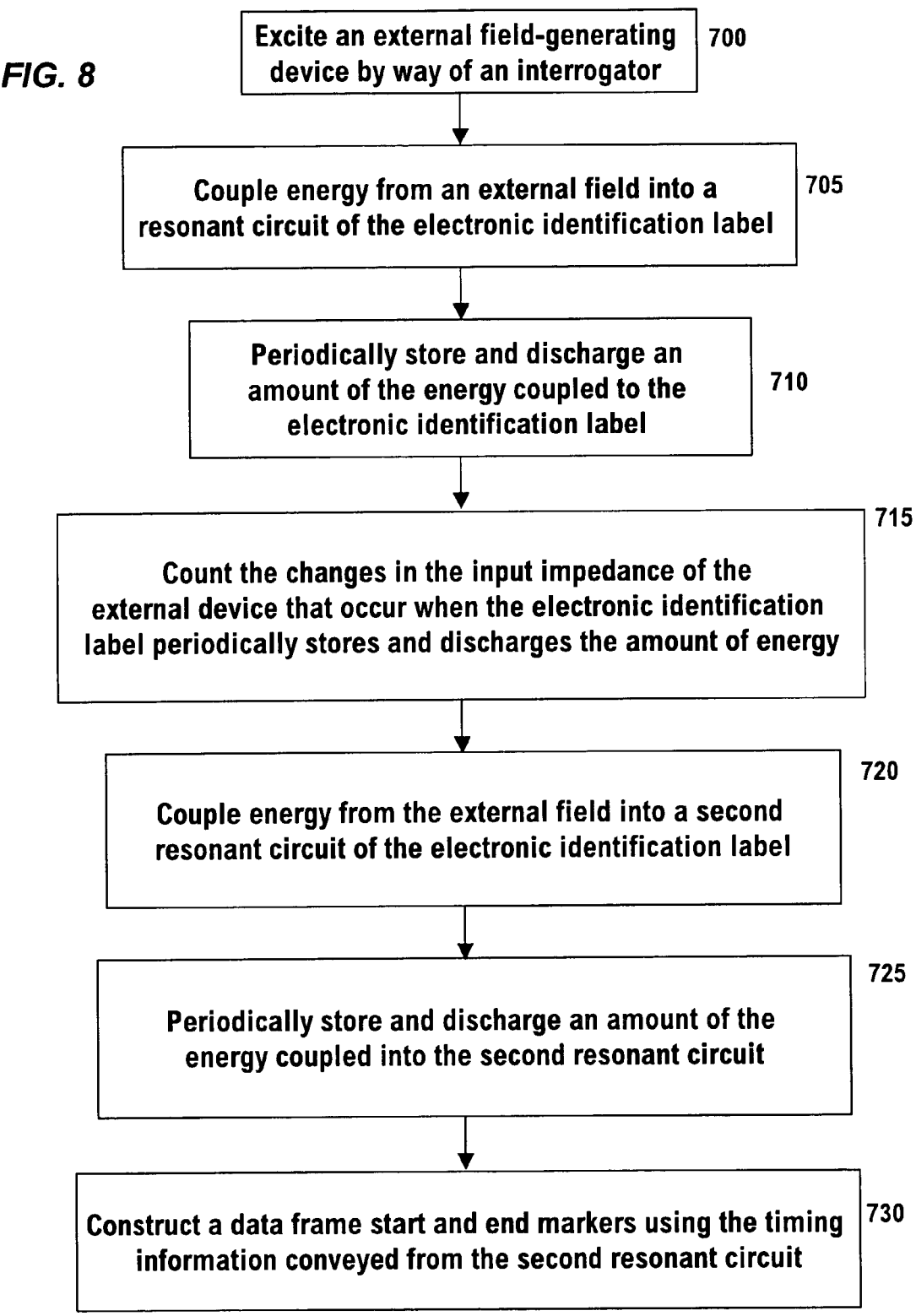
FIG. 8 is a flowchart for a method of conveying information from an electronic identification label to an interrogator in accordance with an embodiment of the invention.

FIG. 8 is a flowchart for a method of conveying information from an electronic identification label to an interrogator in accordance with an embodiment of the invention. The apparatus of FIG. 4a is suitable for performing the method of FIG. 8. The method of FIG. 8 begins at step 700 in which an interrogator excites a field-generating device external to the electronic identification label. The method continues at step 705, in which energy from an external field generated by the interrogator is coupled to a resonant circuit within the electronic identification label. In step 710, the period that the electronic identification label stores and discharges the energy is used to convey information about the electronic identification label to the interrogator. Step 710 may include storing an electrical charge on a capacitor within a storage device associated with the label. Step 710 may further include switching a resistive device to the energy storage device. The resistive device may be latched to the energy storage device to bring about at least a significant discharge of the energy storage device or perhaps even a substantially complete discharge.

The method continues at step 715, which includes recording the changes in the input impedance of an external field-generating device that occur when the electronic identification label periodically stores and discharges the amount of energy stored in the energy storage device. The method continues at step 720 in which energy from an external field is coupled into a second resonant circuit of the electronic identification label. At step 725, energy coupled to the second resonant circuit is periodically stored and discharged. In step 725, the period at which the second resonant circuit stores and discharges energy conveys timing information to the interrogator. The timing information may accompany the information about the electronic identification label conveyed to the interrogator in step 710. The method concludes at step 730 in which an interrogator constructs a data frame start and end marker using the timing information conveyed from the second resonant circuit of step 725.

In some embodiments, not all of steps 700 through 730 may be required. In some embodiments, a method of conveying information from an electronic identification label to an interrogator may only include the steps of coupling energy from an external field to a resonant circuit of the electronic identification label (step 705), the electronic identification label periodically storing and discharging an amount of the coupled energy (step 710), in which the period of the storing and discharging conveys information about the electronic identification label to the interrogator.

Figure 9:
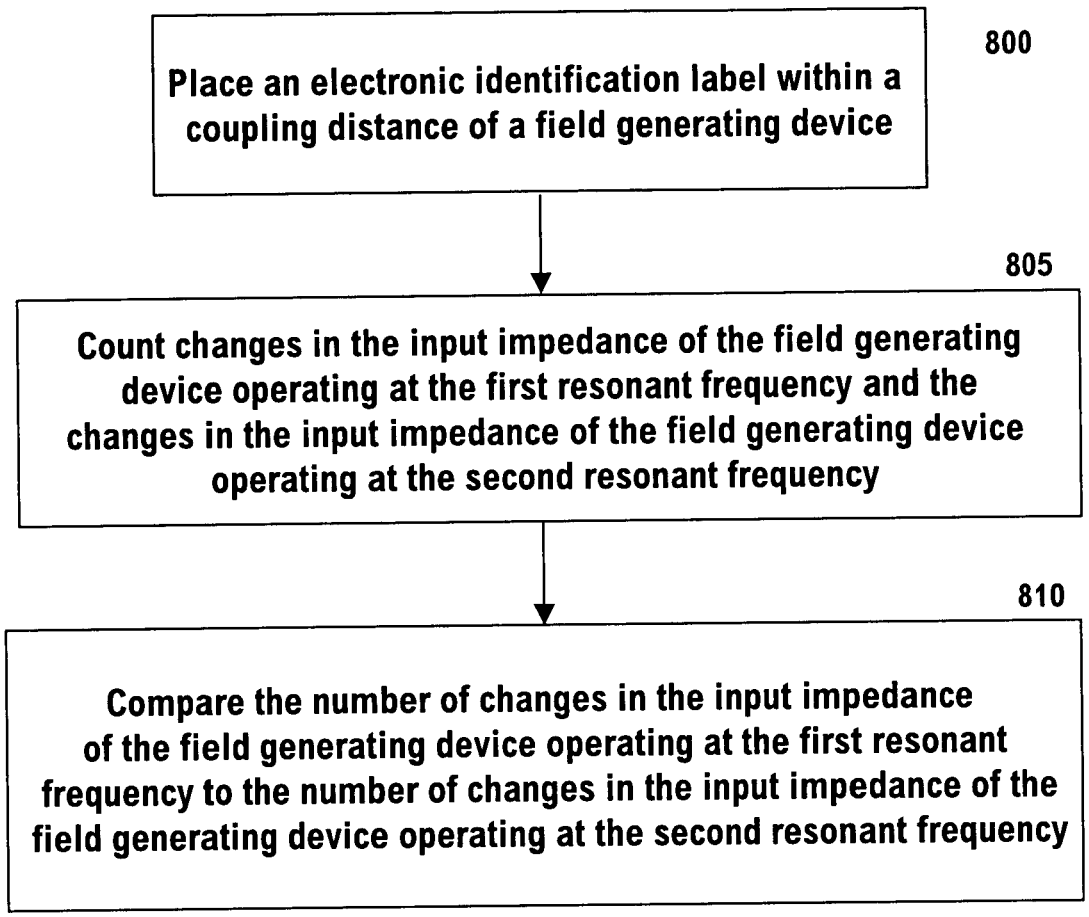
FIG. 9 is a flowchart for a method of interrogating an electronic identification label according to an embodiment of the invention.

FIG. 9 is a flowchart for a method of interrogating an electronic identification label according to an embodiment of the invention. The apparatus of FIG. 4a is suitable for performing the method of FIG. 9. The method begins at step 800 in which an electronic identification label is placed within a coupling distance of a field-generating device. The electronic identification label may include a first and a second resonant circuit that operate at a first and second resonant frequency and may further include additional resonant circuits that operate at additional resonant frequencies.

The method continues at step 805, which includes counting changes in the input impedance of the field-generating device operating at the first resonant frequency as well as counting the changes in the input impedance of the field-generating device operating at the second resonant frequency. In step 805, the change in the input impedance of the field-generating device coupled to either one or both of the first and second resonant circuits can be brought about by switching a resistor in parallel with elements of the first resonant circuit. Step 805 may also include switching resistors into either one or both of the first and second resonant circuits substantially simultaneously with the discharge of energy stored on a storage device coupled to the corresponding resonant circuit. The method continues at step 810, which includes comparing the number of changes in the input impedance of the field-generating device operating at the first resonant frequency to the number of changes in the input impedance of the field-generating device operating at the second resonant frequency.

Figure 10:
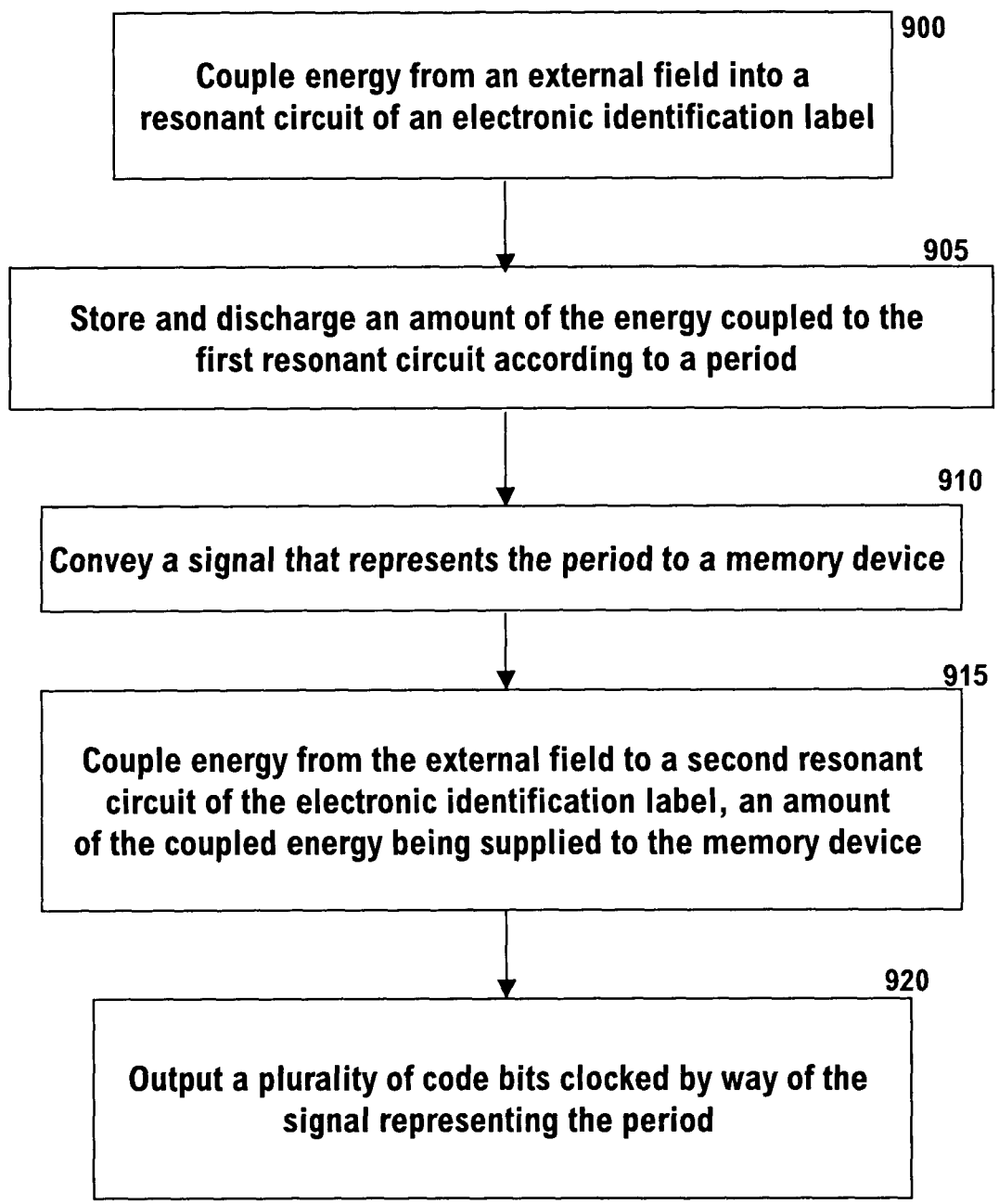
FIG. 10 is a flowchart for a method of conveying information from an electronic identification label to an interrogator in accordance with another embodiment of the invention.

FIG. 10 is a flowchart for a method of conveying information from an electronic identification label to an interrogator in accordance with another embodiment of the invention. The apparatus of FIG. 7a is suitable for performing the method of FIG. 10. The method of FIG. 10 begins at step 900, which includes coupling energy from an external field into a resonant circuit of an electronic identification label. The method continues at step 905, which includes storing and discharging an amount of the energy coupled to the first resonant circuit according to a period. The method continues at step 910 in which a signal that represents the period is conveyed to a memory device. At step 915, energy coupled from the external field is conveyed to a second resonant circuit of the electronic identification label. An amount of the coupled energy is supplied to the memory device. In step 915, the coupling and decoupling of the resistor to the second resonant circuit influences the input impedance to a device that generates the external field. At step 920, the memory device outputs a plurality of binary digits that are clocked by way of the signal representing the period. In step 920, the output of the memory device is used to control the coupling and decoupling of a resistor into and out of a second resonant circuit.

In some embodiments, not all of steps 900 through 920 may be required. In some embodiments, a method of interrogating an electronic identification label may only include the steps of coupling energy from an external field into a resonant circuit of an electronic identification label (step 900), storing and discharging an amount of the energy coupled to the resonant circuit according to a period, step (905), conveying a signal that represents the period to a memory device (step 910), and the memory device outputting a plurality of binary digits clocked by way of the signal representing the period (step 920).

In conclusion, while the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of conveying information from an electronic identification label to an interrogator, comprising:
    coupling energy from an external field to a resonant circuit of the electronic identification label;
    the electronic identification label periodically storing and discharging an amount of the coupled energy; and
    wherein the period of the storing and discharging conveys information about the electronic identification label to the interrogator;
    coupling energy from the external field into a second resonant circuit of the electronic identification label; and
    the electronic identification label periodically storing and discharging an amount of the energy coupled into the second resonant circuit, wherein
    the period during which the electronic identification label stores and discharges the energy coupled into the second resonant circuit conveys timing information to the interrogator that accompanies the information about the electronic identification label, wherein
    the information about the electronic identification label is measured by way of measuring a change in the input impedance to a first field-generating device operating at a first frequency, and wherein the timing information is measured by way of measuring a change in the input impedance to a second field-generating device operating at a second frequency.

2. A method of interrogating an electronic identification label, comprising:
    placing the electronic identification label within a coupling distance of a first and second field-generating device, the electronic identification label having first and second resonant circuits operating at a corresponding first and second frequency;
    counting changes in the input impedance of the first field-generating device and the changes in the input impedance of the second field-generating device; and
    comparing the number of changes in the input impedance of the first field-generating device to the number of changes in the input impedance of the second field-generating device.

3. The method of claim 2, wherein the changes in the input impedance of the first field-generating device are brought about by switching a resistor in parallel with elements of the first resonant circuit.

4. The method of claim 3, wherein switching of the resistor into the first resonant circuit is performed substantially simultaneously with the discharge of energy stored on a storage device coupled to the first resonant circuit.

5. The method of claim 2, wherein the change in the input impedance of the second resonant circuit is brought about by switching a resistor in parallel with elements of the second resonant circuit.

6. The method of claim 5, wherein switching of the resistor into the second resonant circuit is performed substantially simultaneously with the discharge of energy stored on a storage device coupled to the second resonant circuit.

7. The method of claim 2, wherein the change in the input impedance of the first field-generating device is brought about by creating a substantially open circuit in the first resonant circuit.

8. The method of claim 2, wherein the change in the input impedance of the second field-generating device is brought about by creating a substantially open circuit in the second resonant circuit.

9. An electronic identification label, comprising:
    first and second resonant circuits;
    first and second energy storage devices coupled to a corresponding resonant circuit, for storing energy coupled into the first and second resonant circuits;
    first and second switching devices placed between the first and second resonant circuits and the corresponding energy storage device; and
    first and second circuit elements that are periodically coupled and decoupled from the corresponding resonant circuits by way of the corresponding first and second switching devices, wherein
    the rate at which the second circuit element is coupled and decoupled from the second resonant circuit compared to the rate at which the first circuit element is coupled and decoupled from the first resonant circuit conveys information from the electronic identification label to an interrogator.

10. The electronic identification label of claim 9, wherein at least one of the first and second energy storage devices is a capacitor.

11. The electronic identification label of claim 9, wherein at least one of the first and second switching devices includes at least one transistor.

12. The electronic identification label of claim 9, wherein at least one of the first and second circuit elements is a resistor.

13. The electronic identification label of claim 12, wherein at least one of the first and second switching devices periodically couple the resistor to the corresponding energy storage device, thereby removing a substantial portion of energy from the corresponding energy storage device.

14. An electronic identification label, comprising:
    means for wirelessly receiving energy at a predetermined frequency from an external source;
    means for storing the received energy; and means for periodically coupling and decoupling a circuit element into and out of the means for wirelessly receiving energy, wherein
the period of the coupling and decoupling is determined by the amount of energy that can be stored in the means for storing the coupled energy;
second means for wirelessly receiving energy at a second predetermined frequency;
means for storing the received energy received by the second means for wirelessly receiving energy; and
second means for periodically coupling and decoupling a circuit element into and out of the second means for wirelessly receiving energy, wherein
the period of the coupling and decoupling of the circuit element into and out of the second means for wirelessly receiving energy is used to derive timing information used to measure the information about the electronic identification label.

15. An interrogator for use with an electronic identification label; comprising:
a first field-generating device that radiates energy at a first frequency to the electronic identification label;
a first sensor that senses the changes in the quality factor of the electronic identification label at the first frequency;
a second field-generating device that radiates energy at a second frequency to the electronic identification label;
a second sensor that senses the changes in the quality factor of the electronic identification label at the second frequency; and
a processor that determines the respective number of changes in the quality factor at the first and second frequencies and compares the two numbers.

16. The interrogator of claim 15, wherein changes in the quality factor of the electronic identification label at the first frequency are measured as changes in the in put impedance of the first field-generating device operating at the first frequency.

17. The interrogator of claim 15, wherein the processor uses the count of the changes in the quality factor at the first frequency to define a data frame, within which the count of the changes in the quality factor at the second frequency are measured.

18. The interrogator of claim 15, wherein the processor uses the count of the changes in the quality factor at the second frequency to extract information about the electronic identification label.

19. The interrogator of claim 15, wherein the first field-generating device is an inductor that generates a magnetic field.

20. An interrogator for use with an electronic identification label; comprising:
first and second field-generating devices that convey energy to the electronic identification label;
first and second impedance sensors, each coupled to a corresponding one of the first and second field-generating devices; and
a processor, coupled to the first and second impedance sensors, which uses the timing of changes in the input impedance of the first sensor to establish a time base for reading changes in the input impedance of the second sensor.

21. The interrogator of claim 20, further comprising a first and second signal generator for generating signals at a first and second frequency for coupling to the first and second field-generating devices.

22. The interrogator of claim 20, wherein the first and second field-generating devices are inductive devices.

* * * * *

UNITED STATES PATENT AND TRADEMARK OFFICE
CERTIFICATE OF CORRECTION

PATENT NO. : 7,014,112 B2 Page 1 of 1
APPLICATION NO. : 10/425789
DATED : March 21, 2006
INVENTOR(S) : John A deVos et al.

It is certified that error appears in the above-identified patent and that said Letters Patent is hereby corrected as shown below:

In column 11, line 39, in Claim 1, after "energy" delete "; and" and insert -- , --, therefor.

In column 14, line 1, in Claim 16, delete "in put" and insert -- input --, therefor.

Signed and Sealed this

Twenty-first Day of April, 2009

JOHN DOLL
*Acting Director of the United States Patent and Trademark Office*